United States Patent
Hu et al.

(10) Patent No.: US 8,219,310 B2
(45) Date of Patent: Jul. 10, 2012

(54) GPS DEVICE FOR DISPLAYING TRAFFIC CONDITIONS AND METHOD THEREOF

(75) Inventors: Hsin-Nan Hu, Taipei Hsien (TW);
Chao-Feng Ma, Shenzhen (CN);
Kuan-Hong Hsieh, Taipei Hsien (TW);
Xiao-Guang Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 530 days.

(21) Appl. No.: 12/426,937

(22) Filed: Apr. 20, 2009

(65) Prior Publication Data

US 2010/0049437 A1 Feb. 25, 2010

(30) Foreign Application Priority Data

Aug. 19, 2008 (CN) .......................... 2008 1 0304035

(51) Int. Cl.
*G01C 21/36* (2006.01)
(52) U.S. Cl. ..................................... 701/213
(58) Field of Classification Search .................. 701/213
See application file for complete search history.

(56) References Cited

U.S. PATENT DOCUMENTS

| | | | | |
|---|---|---|---|---|
| 5,463,384 A * | 10/1995 | Juds | ............................. | 340/903 |
| 5,680,123 A * | 10/1997 | Lee | ............................. | 340/937 |
| 5,839,086 A * | 11/1998 | Hirano | ........................ | 701/201 |
| 6,014,608 A * | 1/2000 | Seo | ............................. | 701/468 |
| 6,972,675 B2 * | 12/2005 | Mills et al. | ................... | 340/476 |
| 7,295,227 B1 * | 11/2007 | Asahi et al. | .................. | 348/118 |
| 7,463,281 B2 * | 12/2008 | Luskin et al. | ................ | 348/148 |
| 7,482,916 B2 * | 1/2009 | Au et al. | ...................... | 340/475 |
| 7,835,859 B2 * | 11/2010 | Bill | ............................. | 701/209 |
| 2003/0041329 A1 * | 2/2003 | Bassett | ....................... | 725/105 |
| 2003/0227424 A1 * | 12/2003 | Lynch et al. | ..................... | 345/7 |
| 2005/0187710 A1 * | 8/2005 | Walker | ........................ | 701/211 |
| 2006/0271275 A1 * | 11/2006 | Verma | ........................ | 701/200 |
| 2006/0282205 A1 * | 12/2006 | Lange | .......................... | 701/50 |
| 2007/0010942 A1 * | 1/2007 | Bill | ............................. | 701/209 |
| 2008/0079553 A1 * | 4/2008 | Boice | ........................... | 340/435 |
| 2008/0082259 A1 * | 4/2008 | Landschaft et al. | .......... | 701/207 |

* cited by examiner

*Primary Examiner* — Mark Fadok
(74) *Attorney, Agent, or Firm* — Altis Law Group, Inc.

(57) ABSTRACT

This present disclosure provides a GPS device for displaying traffic conditions and method thereof. The GPS device defines turn distance ranges according to GPS navigation information. When running into the defined turn distance range, the vehicle turns on a video device and turn signal lamps automatically, and displays the video feed provided by the video device. When passing by the defined turn distance range, the vehicle turns off the video device and the turn signal lamps automatically.

10 Claims, 3 Drawing Sheets

GPS DEVICE FOR DISPLAYING TRAFFIC CONDITIONS AND METHOD THEREOF

BACKGROUND

1. Technical Field

The present disclosure relates to a global position system (GPS) device for displaying traffic conditions and method thereof.

2. Description of Related Art

As more and more cars are on the road, traffic jams become a serious problem. It is not easy for drivers to keep track of the traffic around them, especially during turning maneuvers. Therefore, it is necessary to provide a GPS device for displaying traffic conditions and method thereof to help the driver keep better track of traffic conditions.

BRIEF DESCRIPTION OF THE DRAWINGS

The components in the drawings are not necessarily drawn to scale, the emphasis instead being placed upon clearly illustrating the principles of the GPS device for displaying traffic conditions. Moreover, in the drawings, like reference numerals designate corresponding parts throughout the several views.

DETAILED DESCRIPTION OF THE EMBODIMENTS

Figure 1:
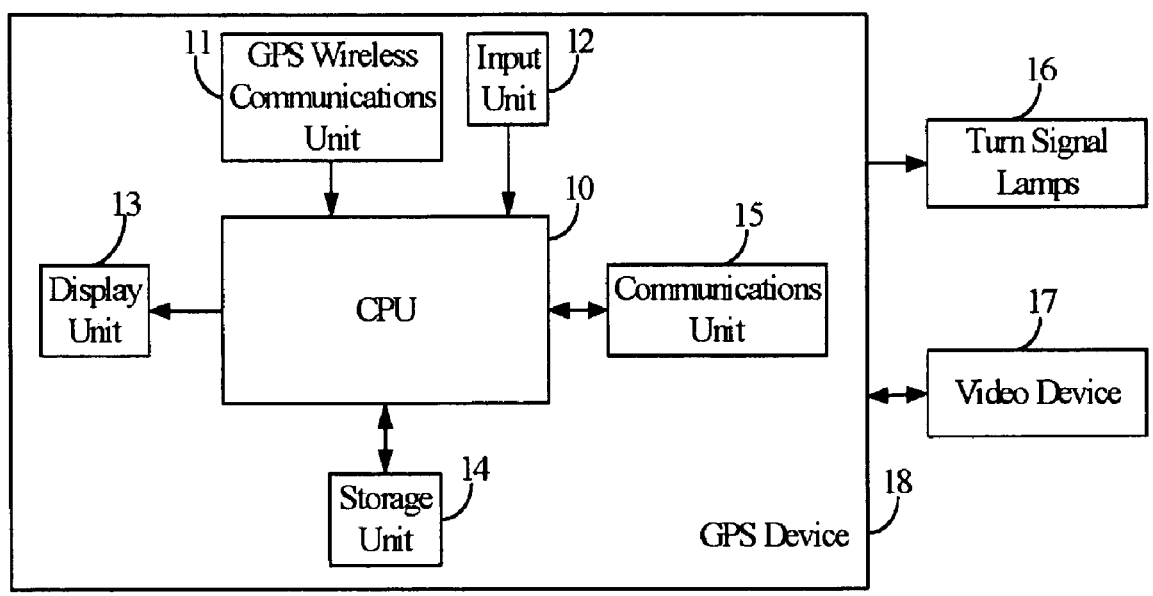
FIG. 1 is a block diagram of a hardware infrastructure of a GPS system, which includes a GPS device, for displaying traffic conditions in accordance with an exemplary embodiment.

Referring to FIG. 1, the GPS system for displaying traffic conditions typically includes at least four turn signal lamps 16, at least one video device 17, and a GPS device 18.

Each of the turn signal lamps 16 is disposed at an appropriate position of the vehicle. For example, two turn signal lamps 16 are arranged on a left side of the vehicle, and two turn signal lamps 16 are arranged on a right side of the vehicle. In addition, when the vehicle turns left, the left turn signal lamps 16 turn on; when the vehicle turns right, the right turn signal lamps 16 turn on. After finishing a turn, the vehicle turns off the corresponding turn signal lamps 16.

The video device 17 is mounted and aimed to give a view of traffic conditions in the immediate vicinity of the vehicle. For example, when the vehicle begins to turn at a current location, the video device 17 turns on to provide a live feed of the immediate area around the vehicle to the GPS device 18. When the vehicle finishes a turn, the video device 17 turns off. The video device 17 may be any number of cameras needed to provide clear views for the driver. For example, a camera may be arranged on the front of the vehicle, another on the rear of the vehicle, and yet another on the top of the vehicle.

The GPS device 18 includes a central processing unit (CPU) 10, a GPS wireless communications unit 11, an input unit 12, a display unit 13, a storage unit 14, and a communications unit 15.

The GPS wireless communications unit 11 is configured to receive GPS satellite navigation signals in real time, and transmit the navigation signals to the CPU 10. The input unit 12 is configured to generate instructions in response to user operations. The display unit 13 is configured to display navigation information or live views from the video device 17. The display unit 13 is connected to the GPS device 18 and positioned where a driver may safely view it before executing a turn. The video device 17 sends a live feed to the display unit 13 so that a driver may easily determine traffic conditions in the immediate vicinity to judge when it is safe to turn and to know if he must take emergency action during a turn to avoid an accident. The navigation information includes, but is not limited to, the current vehicle location and the best route information. The storage unit 14 is configured to store data generated by the CPU 10. The communications unit 15 is configured to transmit communication data between the GPS device 18 and external devices of the GPS device 18. The communications unit 15 may be a wireless communications unit, such as a BLUETOOTH device, and may further be a wired communications unit, such as that based on RS232 standard.

Figure 2:
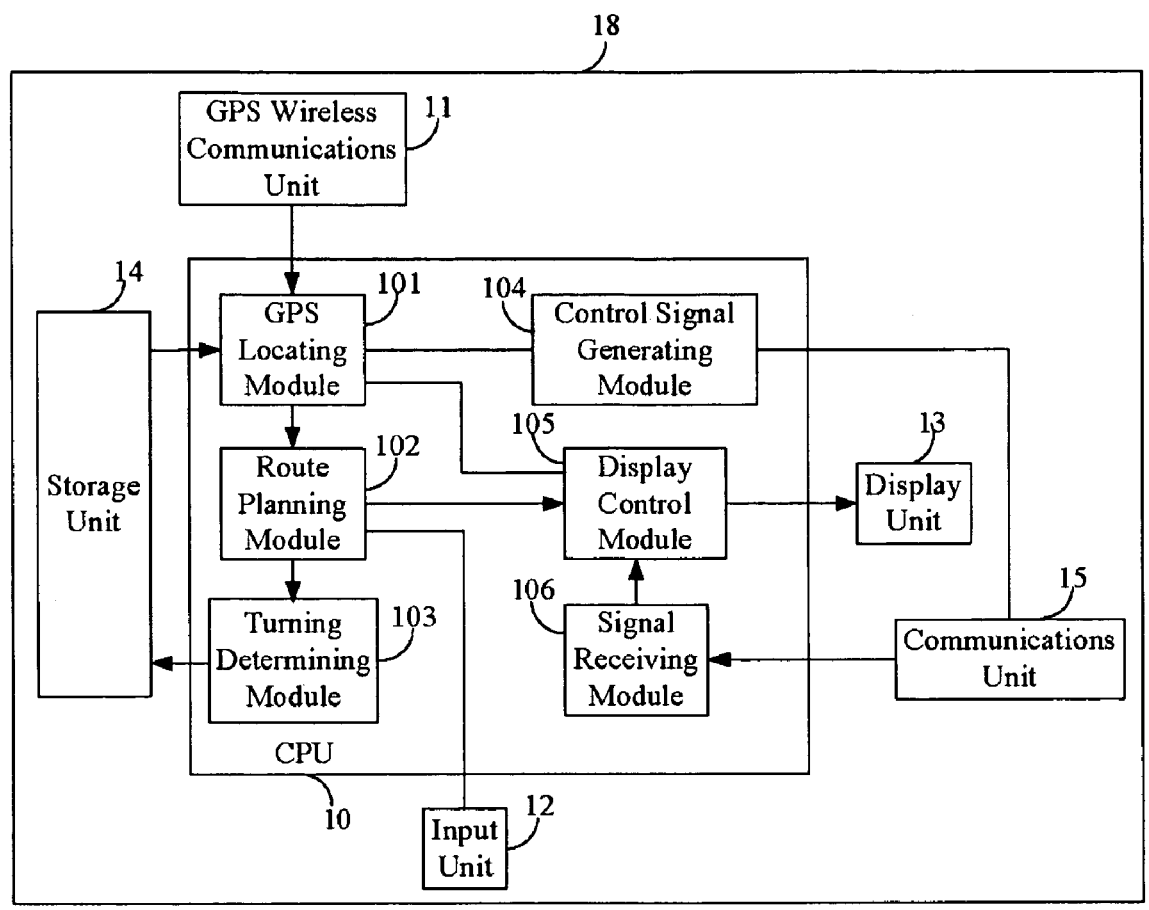
FIG. 2 is a block diagram showing main function modules of a central processing unit (CPU) of the GPS device for displaying traffic conditions of FIG. 1, in accordance with an exemplary embodiment.

Referring to FIG. 2, the CPU 10 includes a GPS locating module 101, a route planning module 102, a turn determining module 103, a control signal generating module 104, a display control module 105, and a signal receiving module 106.

The GPS locating module 101 is configured to receive the navigation signals from the GPS wireless communications unit 11, and determine a current location of the vehicle according to the navigation signals. The route planning module 102 is configured to obtain a best route according to the current location of the vehicle and the user input operations from the input unit 12. User input operations may not only include destination information, but also include preferred route selection means.

The turn determining module 103 is configured to determine turn information for each turning maneuver that should occur along the best route. The turn information includes, but is not limited to, a turning direction, a turn start position, and a turn end position. The turn determining module 103 determines the turn information in two modes. For example, in a first mode, the turn determining module 103 determines all of the turn information for each anticipated turning maneuver along the best route, numbers each turning maneuver, and saves the determined turn information for each turning maneuver in the storage unit 14. In a second mode, the turn determining module 103 obtains next turn information when the vehicle finishes a turn, and saves the next turn information to the storage unit 14. In the exemplary embodiment, the turn start position is defined as a location having a predetermined distance from the turn point, and the turn end position is defined as another location which has another predetermined distance away from the turn point.

In an exemplary embodiment, when it is time for vehicle using the GPS device to begin a turning maneuver, the device automatically turns on a video device 17 and the appropriate turn signal lamps 16, and displays the video feed provided by the video device 17. When the turn is completed, the device turns off the video device 17 and the turn signal lamps 16. The turn information may further be provided for anticipated lane changes. For example, the vehicle coming out of a right turn needs to move to a left turn lane for an impending left turn, the GPS device 18 generates and transmits a left turn control signal to the video device 17, the GPS device 18 further generates and transmits another left turn control signal to the video device 17 after lane change is completed. In this way, a driver is supplied needed views of traffic for a series of maneuvers such as a right turn, left lane change, and a left turn. In another exemplary embodiment, the turn information further includes backup information. For example, the GPS device 18 turns on the video device 17 having a view to the rear of the vehicle when the vehicle has been shifted into reverse, then the GPS device 18 turns off the video device 17 when the vehicle is shifted from reverse.

The GPS locating module 101 periodically compares the current location of the vehicle with the turn start position. When the vehicle is at the turn start position, the control signal generating module 104 sends either a left or a right turn start signal to the communications unit 15, the communications unit 15 transmits the signal to control the appropriate video device 17 and turn signal lamps 16 to turn on. The video device 17 then turns on to provide a live feed to the signal receiving module 106. The signal receiving module 106 is configured to send the received live feed to the display control module 105. The display control module 105 automatically switches the display unit 13 to display the live feed when it is received and switches back when the live feed ends.

When the current location of the vehicle is the turn end position, the control signal generating module 104 generates a left or a right turn control signal. The video device 17 and turn signal lamps 16 turn off in response to the turn control signal.

Figure 3:
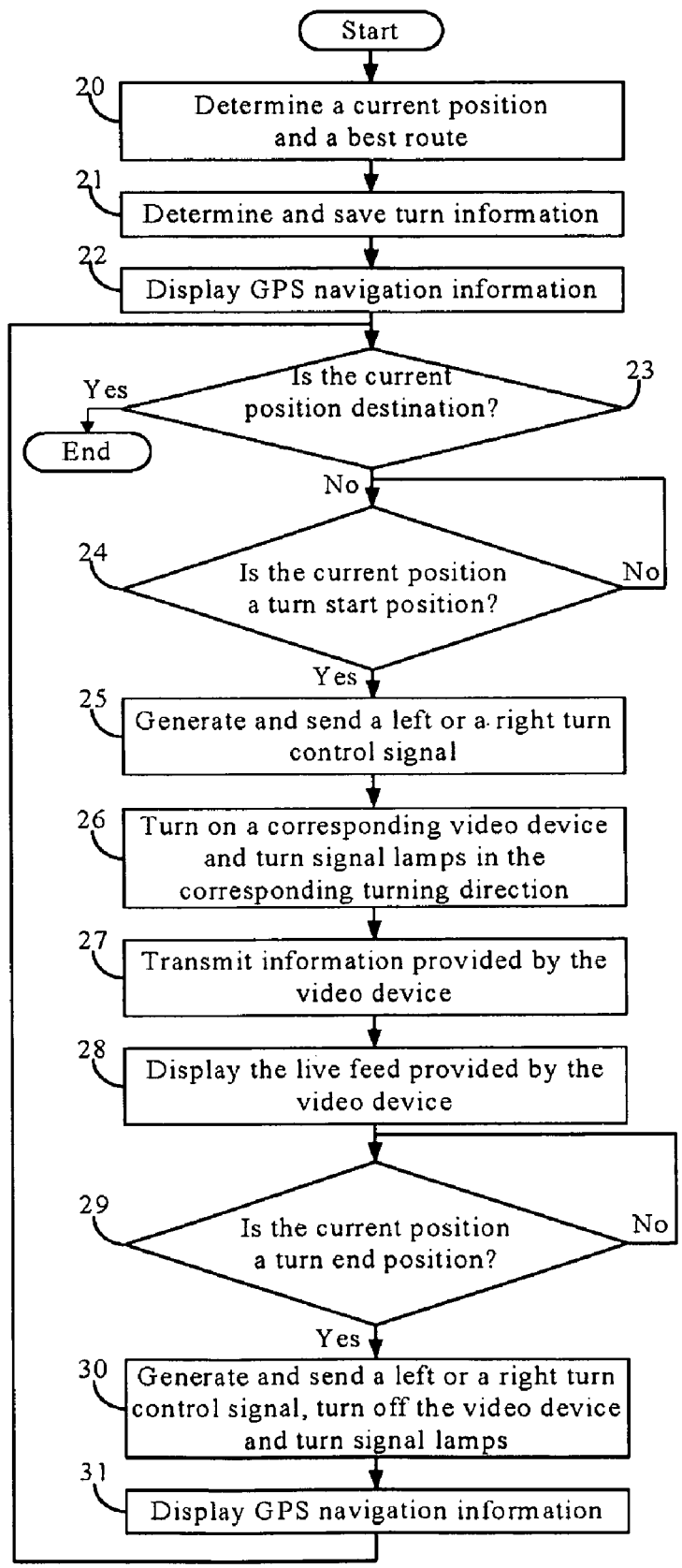
FIG. 3 is a flowchart of a method for displaying traffic conditions implemented by the system of FIG. 1, in accordance with an exemplary embodiment.

FIG. 3 is a flowchart of displaying traffic conditions method implemented by the system in accordance with an exemplary embodiment. In step 20, the GPS locating module 101 determines current location of the vehicle, and the route planning module 102 obtains a best route.

In step 21, the turn determining module 103 determines turn information according to the best route, and saves the turn information to the storage unit 14.

In step 22, the display control module 105 controls the display unit 13 to display the navigation information.

In step 23, the route planning module 102 periodically compares the current location of the vehicle with the destination information to determine whether the current location is the destination. When the current location is the destination, the procedure is finished.

In step 24, when the current location isn't the destination, the GPS locating module 101 periodically compares the current location of the vehicle with turn start position to determine whether the vehicle arrives at the turn start position. When the current location isn't the turn start position, the procedure repeats step 24.

In step 25, when the current location is the turn start position, the control signal generating module 104 generates and sends a left or a right signal to a video device 17 and turn signal lamps 16 in corresponding turning direction.

In step 26, the video device 17 and the turn signal lamps 16 in the corresponding turning direction turn on in response to the control signals.

In step 27, the video device 17 provides video feed to the signal receiving module 106.

In step 28, the display control module 105 switches the display unit 13 to display the live feed from the signal receiving module 106.

In step 29, the GPS locating module 101 periodically compares with the current location with the turn end position to determine whether the vehicle arrives at the turn end position. When the vehicle doesn't arrive, the procedure repeats step 29.

In step 30, when the current location is the turn end position, the control signal generating module 104 generates and sends a left or a right turn control signal to the appropriate video device 17 and turn signal lamps 16. The video device 17 and turn signal lamps 16 turn off in response to the turn control signal.

In step 31, the display control module 105 switches back to display the navigation information which is determined by the GPS locating module 101 and the route planning module 102.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the present invention.

What is claimed is:

1. A global position system (GPS) device used in a vehicle, comprising:
   a GPS wireless communications unit configured to receive GPS satellite navigation signals in real time;
   a GPS locating module configured to receive the navigation signals from the GPS wireless communications unit, and determine a current location of the vehicle according to the navigation signals;
   a route planning module configured to obtain a best route;
   a display unit configured to display information, wherein the information comprises current traffic conditions around the vehicle and navigation information corresponding to the navigation signals;
   a communications unit configured to transmit communication data between the GPS device and external devices of the GPS device;
   a turn determining module configured to determine turn information for each turning maneuver that should occur along the best route, and the turn information comprising a turn start position and a turn end position wherein the turn start position of a turn information for a turning maneuver is defined as a location having a predetermined distance away from a turn point where the turning maneuver is to occur, and the turn end position of the turn information for the turning maneuver is defined as another location having another predetermined distance away from the turn point;
   a storage unit configured to connect with the GPS locating module and the turn determining module;
   a control signal generating module configured to generate a left or a right turn control signal when the GPS locating module determines the current location is a turn start position of a turning maneuver, and send the control signal to control a video device to provide the current traffic conditions around the vehicle, and generate another left or another right turn control signal when the GPS locating module determines the current location is a turn end position of the turning maneuver, and send the turn control signal to turn off the video device;
   a signal receiving module configured to receive an video feed provided by the video device; and
   a display control module configured to automatically switch the display unit to display the live feed traffic conditions when it is received and switch back to display the navigation information when the live feed ends.

2. The GPS device as described in claim 1, wherein the control signal generating module further sends the left or the right turn control signal to turn on turn signal lamps through the communications unit, and sends the another left or another right turn control signal to turn off the turn signal lamps.

3. The GPS device as described in claim 2, wherein the control signal generating module is configured to generate a reverse control signal to turn on the video device having a view to the rear of the vehicle when the vehicle has been shifted into reverse, and to generate another reverse control signal to turn off the video device when the vehicle is shifted from reverse.

4. The GPS device as described in claim 1, wherein the turn determining module determines turn information for all the turning maneuver that occur along the best route, numbers each turning maneuver, and saves the determined turn information in the storage unit.

5. The GPS device as described in claim 1, wherein the turn determining module determines next turn information of a next turning maneuver when the vehicle finishes a turn, and saves the next turn information to the storage unit.

6. A method of displaying traffic conditions used in a global position system (GPS) device of a vehicle, the GPS device comprises a GPS wireless communications unit configured to receive GPS satellite navigation signals in real time, the method comprising:

- determining turn information for each turning maneuver according to navigation information which correspond to the navigation signals, and saving the determined turn information, and the turn information comprising a turn start position and a turn end position wherein the turn start position of a turn information for a turning maneuver is defined as a location having a predetermined distance away from a turn point where the turning maneuver is to occur, and the turn end position of the turn information for the turning maneuver is defined as another location having another predetermined distance away from the turn point;
- generating and transmitting a left or a right turn control signal to control a video device to provide live feed of traffic conditions around the vehicle through a communications unit, after determining that the vehicle arrives at a turn start position of a turning maneuver;
- receiving an video feed provided by the video device through the communications unit;
- switching a display unit to display the provided video feed;
- generating and transmitting another left or another right turn control signal to turn off the video device through the communications unit, after determining that the vehicle arrives at a turn end position of the turning maneuver; and
- switching back to display the navigation information when the live feed of traffic conditions ends.

7. The method of claim 6, further comprising:

- transmitting the left or right turn control signal to turn on turn signal lamps through the communication unit, after determining that the vehicle arrives at the turn start position;
- transmitting the another left or another right turn control signal to turn off the turn signal lamps through the communications unit, when determining that the vehicle arrives at the turn end position.

8. The method of claim 7, further comprising:

- generating a reverse control signal to turn on the video device having a view to the rear of the vehicle when the vehicle has been shifted into reverse, and to generate another reverse control signal to turn off the video device when the vehicle is shifted from reverse.

9. The method of claim 6, wherein the step of determining turn information is determining turn information for all the turning maneuver that occur along the best route, numbers each turning maneuver, and saves the determined turn information in the storage unit.

10. The method of claim 6, wherein the step of determining turn information is determining next turn information for a next turning maneuver when the vehicle finishes a turn, and saves the next turn information to the storage unit.

* * * * *